United States Patent [19]

Lu

[11] Patent Number: 4,814,799
[45] Date of Patent: Mar. 21, 1989

[54] METHOD AND APPARATUS FOR CREATING A PHOTOMASK FOR PROJECTING AN IMAGE

[75] Inventor: Sun Lu, San Jose, Calif.

[73] Assignee: The Mead Corporation, Dayton, Ohio

[21] Appl. No.: 182,271

[22] Filed: Apr. 15, 1988

[51] Int. Cl.$^4$ .............................................. G01D 15/00
[52] U.S. Cl. ..................................... 346/160; 346/157
[58] Field of Search ................... 346/157, 160, 107 R, 346/108; 355/4; 101/DIG. 13; 358/300, 302; 400/119

[56] References Cited

U.S. PATENT DOCUMENTS 4,761,046 8/1988 Funato ...................................... 355/4
4,768,046 8/1988 Minor et al. .......................... 346/157

Primary Examiner—Arthur G. Evans
Attorney, Agent, or Firm—Biebel, French & Nauman

[57] ABSTRACT

A method and apparatus for creating a photomask corresponding to an image utilizes a planar disc having at least a portion of its surface formed from a photosensitive material. The disc is mounted for rotation. A laser beam source is supported at a spaced relationship with respect to the disc. One or more laser beams from the source are focused onto the disc. The laser source is moved radially with respect to the disc, whereby the laser beams scan the surface of the disc. The beams are modulated in accordance with information corresponding to the image to cause the image to be written onto the photosensitive material on the rotating disc by the laser beam.

28 Claims, 1 Drawing Sheet

METHOD AND APPARATUS FOR CREATING A PHOTOMASK FOR PROJECTING AN IMAGE

BACKGROUND OF THE INVENTION

The present invention relates generally to photomasks useful in projecting an image. More particularly, the invention relates to erasable and reusable photomasks formed from photosensitive materials, including liquid crystal materials, and methods and apparatus for forming such photomasks.

It is known to use a photomask in projecting an image. Such a photomask can take a number of forms, including a photographically printed mask such as a photographic slide, or a xerographically printed mask such as an overhead projector transparency. Another known photomask uses a liquid crystal material. The liquid crystal material is normally transparent at ambient operating temperatures. Selective heating of small areas of the crystal creates light-scattering regions in the heated areas, thereby creating a pattern of scattering regions on an otherwise non-scattering background. Once the liquid crystal has been completely written, light may be projected through or reflected off the liquid cyrstal cell to project the image formed in the crystal.

One example of a liquid crystal photomask generating system can be seen in U.S. Pat. No. 4,564,853. A laser diode is used to apply writing heat to a liquid crystal cell to form a photomask through which visible light is later projected for printing an image on a photosensitive material. The laser beam emanating from the diode is directed onto X-Y scanning mirrors under the control of X-Y scanning galvanometers. Through proper control of the galvanometers, the beam is scanned over the entire area of the liquid crystal cell. By turning the laser beam on and off at appropriate times, data is written which forms the image in the liquid crystal photomask.

Other scanning arrangements for the laser beam are known. For example, in addition to a galvanometer scanner, a rotating drum scanner or acousto-optical scanner may also be used. Further, other photosensitive media than a liquid crystal are known which can be written upon by a laser beam to form an image.

Several disadvantages exist with any of these writing systems. The laser beam is focused onto the liquid crystal surface. However, the laser focal plane is not flat, and some form of focal plane correction is required to maintain focus at the writing surface. As a result, it is generally difficult to have very high resolution. Resolution is further degraded because the path length for the beam from the laser source to the liquid crystal must be relatively long to enable the beam to be scanned over the entire writing surface. Finally, known systems are generally appropriate only for use with a laser writing head having a single laser diode. Consequently, writing speed for such a system is generally slow.

What is needed, therefore, is a system for writing with a laser onto a photosensitive surface which overcomes the disadvantages of known systems as described above. Particularly, such a system should be of relatively simple construction, without requiring complicated devices for focal plane correction. Very high resolution in the written image should be possible. To increase writing speed, such a system should further be capable of use with multiple laser diodes.

SUMMARY OF THE INVENTION

In meeting the foregoing needs, the present invention provides apparatus for creating a photomask, including a planar disc having at least a portion of the surface area of the disc defined by a photosensitive material. Means is provided for mounting and rotating the disc. A laser beam source is supported at a spaced relationship with respect to the disc. Means is provided for focusing a laser beam from the source onto the disc, as well as for moving the laser source mounting means radially with respect to the disc. As a result, the laser beam is caused to scan the surface area of the disc. A modulation means modulates the laser beam in accordance with information corresponding to an image to cause the image to be written onto the photosensitive material by the laser beam.

The planar disc may include a plurality of discrete regions defined by the photosensitive material. The discrete regions are preferably substantally rectangular, and three of the discrete regions may be provided on the disc. More preferably, the discrete regions may be square, with the three regions being arranged symmetrically on the disc.

The photosensitive material is preferably a liquid crystal, and the liquid crystal may be made either reflective or transmissive.

The rotation means preferably rotates the disc such that the laser beam scans the surface of the disc at a constant linear velocity.

The laser beam source may produce a plurality of laser beams, with each of the beams being focused simultaneouly onto the disc. The modulating means then modulates each of the beams independently to cause each beam to write a separate portion of the image onto the disc.

In such a case, the laser beam source may include a plurality of laser emitting diodes. The means for focusing the beams includes a plurality of optical fibers, each of the fibers receiving one of the beams from one of the laser emitting diodes. The fibers are arranged into an array for focusing the beams onto the disc.

The present invention also includes a method of creating a photomask, which method includes mounting for rotation a planar disc having at least a portion of the surface area of the disc defined by a photosensitive material. The disc is rotated. A laser beam source is supported at a spaced relationship with respect to the disc. At least one laser beam is focused from the source onto the disc. Simultaneously with rotating the disc, the source is moved radially with respect to the disc to cause the laser beam to scan the surface area of the disc. The laser beam is modulated during the scanning in accordance with information corresponding to an image to cause the image to be written onto the photosensitive material by the laser beam.

Accordingly, it is an object of the present invention to provide a method and apparatus for producing a photomask corresponding to an image; to provide such a method and apparatus that is of relatively simple construction; to provide such a method and apparatus that does not require complicated devices for focal plane correction; to provide such a method and apparatus that achieves very high resolution in the written image; to provide such a method and apparatus that uses generally conventional, commercially available components; and to provide such a method and apparatus that can utilize multiple laser diodes.

DETAILED DESCRIPTION OF PREFERRED EMBODIMENT

Figure 1:
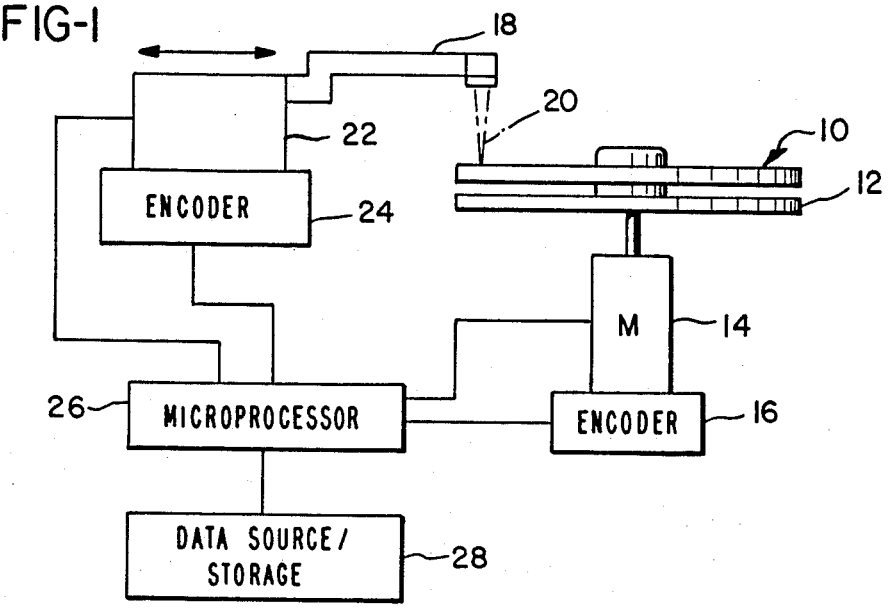
FIG. 1 generally schematic view of the apparatus for producing a photomask in accordance with the present invention.

Referring now to FIG. 1, the apparatus for writing with a laser on a photosensitive surface to form a photomask is shown. Included is a disc 10 having photosensitive materials arranged thereon in a manner to be described in detail below. Disc 10 is attached to a turntable 12 in a manner conventional for use with optical disc memory systems. Turntable 12 is in turn attached to a motor 14 which rotates disc 10 and turntable 12. Connected to motor 14 is a high resolution optical shaft encoder 16 used for controlling rotational speed of the turntable and for synchronization with data to be written onto the photosensitive surface.

A laser writing head 18 includes a laser diode, a collimation lens, beam-shaping prisms and a focusing lens mounted to produce an output writing beam 20. Writing head 18 is supported above disc 10 such that beam 20 is focused onto the surface of disc 10. A linear motor 22 is connected to writing head 18 for movement of the writing head in a radial direction with respect to disc 10. A linear encoder 24 is coupled to motor 22 for monitoring the position of laser writing head 18.

Motors 14 and 22 and encoders 16 and 24 are all linked to an appropriate microprocessor 26 for controlling the writing system. In addition, microprocessor 26 receives image data from an appropriate data source and/or storage means 28. This source and/or storage means may include an original document scanner generating image data, a memory device storing image data, communication lines receiving image data, or any othe means from which image data can be obtained.

Figure 2:
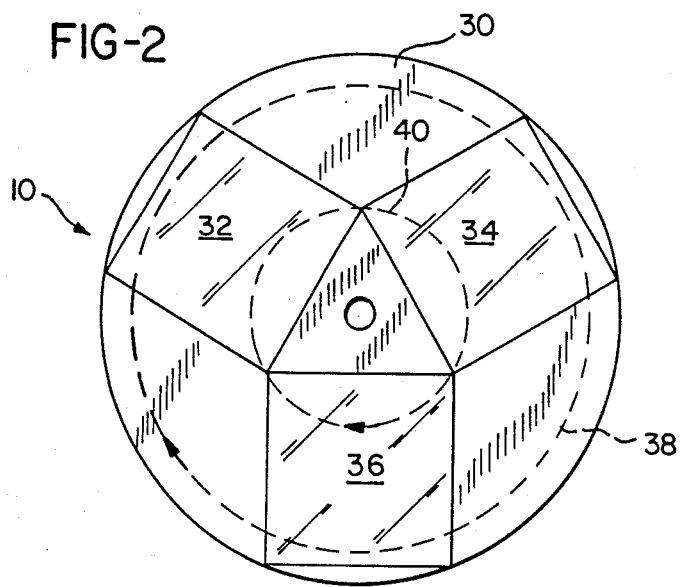
FIG. 2 is a plan view of a disc used in the apparatus of FIG. 1 on which a photomask is produced.

The surface of disc 10 can be seen by reference to FIG. 2. The disc body 30 is preferably formed from an aluminum or other lightweight rigid material. Mounted to the disc body 30 are three cells 32, 34, and 36 formed from a photosensitive material. In a preferred embodiment, this photosensitive material is a smectic liquid crystal, and in any event is capable of being written upon by the beam emitted from the laser diode of the writing head. When disc 10 is placed onto turntable 12 and rotated, the laser head may be used to write data onto the rotating disc. Through movement of the head in a radial direction with respect to the disc, the entire disc may be scanned in a general spiral pattern, thereby writing information onto each of the three cells 32, 34, and 36. Alternatively, the laser head may be held at a fixed radius to write concentric tracks on the cells. The head may be stepped to a succeeding track when the head is over a dead space between liquid crystal cells.

For the preferred liquid cyrstal photosensitive material, the method of writing image data into the cells is well known in the art. Initially, each cell 32, 34 and 36 contains a smectic liquid crystal in a non-scattering or unwritten configuration so that it is uniformly transparent or reflective over its entire surface at the ambient operating temperature. Writing is accomplished by selectively heating small areas of the crystal to the isotropic state by the laser diode beam, and rapidly cooling such areas back into the smectic state, thereby creating scattering centers in those regions which were loclly heated. After writing, a pattern of spots is created on an otherwise non-scattering background. The cells 32, 34 and 36 may be used as photomasks by the projection of light onto the entire area of each cell. Such light either is transmitted through or reflected by the non-scattering areas, thereby resulting in a projected image.

Use of the liquid crystal material is advantageous in that the disc may be erased after projection for reuse. Other erasable photosensitive materials will also achieve this advantage. However, nonerasable materials, such as photographic films, can be use with the present invention. Such materials may be advantageous in applications where the photomasks are to be indefinitely preserved.

In the preferred embodiment, disc 10 includes three cells 32, 34 and 36, so that information regarding a full color image may be written onto a single disc 10. In such a case, each cell corresponds to one of the three color components of the image, i. e., the magenta, yellow and cyan portions. However, it should also be recognized that it is not necessary for disc 10 to be restricted to three cells. Where appropriate, some other number of cells may be provided, limited only by the size of the disc and desired size of the cells.

In writing images onto the cells, motor 14 is energized to rotate disc 10, with rotational speed being monitored by encoder 16 until the speed is locked into a predetermined value. Any appropriate means regulating rotational speed may be used. One example is shown in U.S. Pat. No. 4,603,412. Laser writing head 18 is then controlled by an appropriate ramp circuit to write information onto the cells in a known manner. It should be noted that, when the cells represent the three color components of a full color image, for each disc rotation the writing head will write an information track on each cell that represents the magenta, yellow, and cyan portions of the image. Thus, the video signal supplied to writing head 18 must be interlaced with the magenta, yellow and cyan signals for each scanned line.

In a conventional optical disc drive, the laser focusing lens and the writing head typically includes a servomechanism for locking the laser beam spot onto a data track on the disc and maintaining the proper focus on the recording material. One example is shown in U.S. Pat. No. 4,607,157. For the invention described herein, a tracking servo is not required since the typical track pitch is about 12 microns. However, it is necessary to include a linear encoder to track the radial position of the writing head for video synchronization purposes. Also, a focusing servo is generally not required. This will depend on the F-number of the focusing lens (which determines the focal depth) and the degree of precision of the disc assembly and cells carried thereon.

Where the written cells are intended for use as photomasks, disc 10 may be permanently mounted to turntable 12. In such a case, laser head 18 is retracted after writing and turntable 12 is stepped by motor 14 to place each cell 32, 34 and 36 into the proper location for projecting the image onto a photosensitive material or display screen. The shaft encoder 16 can be used to accurately position the cells to achieve proper registration.

If the cells are formed from a liquid crystal material, it may be difficult to change the cell temperature quickly because of the high thermal mass of the turn table 12. Thus, the recorded image may be projected with the cells at the writing temperature. In such a case, it may not be desirable to manntain the temperature of disc 10 too close to the smectic to nematic transition point. At such a temperature, writing sensitivity is enhanced, but image contrast may be reduced.

If the liquid crystal cells 32, 34 and 36 are transmissive, it will be necessary to include openings through turntable 12 to allow projection light to pass.

Disc 10 can also be made removable from turn table 12, in which case the written disc may be mounted onto a similar spindle for image projection. Such an approach has the advantage of higher throughput, in that a second disc can be mounted to the writing device and written while the original disc is being used for projection. Various devices for automatically handling the discs to carry out such a function are well known in the art.

Because the scanning motion of the laser beam in this device is linear and not angular, it is possible to use multiple laser diodes to increase the writing speed of the system. Two possible configurations for a multiple beam writing head can be used. First, a laser diode array with individually addressed emitting elements could be provided. The collimation and focusing lenses used in the writing head have sufficient flat field to accommodate a small array of, for example, eight laser emitters. Thus, the single laser diode is simply replaced with the array in the writing head.

A second possibility is to use optical fibers to bring the emission of several individual laser diodes together. The ends of the fibers are then polished and assembled to form a closely packed array. A reduction lens is used to form an image of the fiber end emitters onto the photosensitive material. Such an array using 32 laser diodes is described in A. G. Dewey, "Laser Addressed Liquid Crystal Displays," *Optical Engineering*, Vol. 23, No. 3, p. 230 (1984).

It will also be recognized that the laser-scanning system desribed herein is an R scanning system, and the scan lines represent concentric circular arcs. If the disc is rotated at a constant angular velocity, the scan rate for the system descreases as the laser head moves toward the center of the disc. However, it is known in the art of the video discs to utilize a constant linear velocity operation scheme. See, for example, U.S. Pat. No. 4,603,412. Thus, the scanner described herein can be operated at a constant scan speed from track to track.

Most sources of video input information are in the form of an X-Y raster format. Thus, to use the system described herein, a conversion to an R format is required. However, algorithms for converting data between such formats are well known, and the means for implementing them will be apparent to those skilled in the art.

It is also possible to utilize an X-Y scan with a rotating disc. In such a case, the laser writing head can be controlled by a closed loop servo system to move the writing head in and out in synchronous fashion with disc rotation to generate straight scan lines on the rotating disc. However, such a system is relatively complex in that with the disc rotating either at a constant angular velocity or at a constant linear velocity, scan speed changes not only from track to track, but also along an individual track. Thus, some form of scan rate compensation must be implemented in order to generate distortion-free images.

In nne practical example for this system, relatively low cost 5-mW laser diodes are used to provide a writing beam for writing onto a disc carrying three liquid crystal cells, arranged as shown in FIG. 2. At such power, a laser pulse of 8 microseconds can write a 15 micron dot at 44° C. Eight such laser diodes are provided, using fiberoptics to form an eight-beam array directed onto the disc surface. Such a system can then achieve a writing rate of one million pixels per second.

Disc size is dependent upon the size of the liquid crystal cells, which is in turn dependent upon the number of pixels pe scan line and the spacing of the individual pixels. For example, if dots are written at a 0.0005" (12.7 micron) spacing an image with a pixel array of 3000×3000 will require a cell 1.5"×1.5" (3.8 cm×3.8 cm) and an image with a pixel array of 8000×8000 will require a cell 4"×4" (10 cm×10 cm). The disc size required in the former case is about 5" (12.5 cm) in diameter, and about 12" (30 cm) in the latter.

Disc rotation speed at one million pixels per second writing rate can be estimated as follows: If N is the number of pixels per scan line per cell, the laser head can write 3×N pixels per rotation per beam. If the scanner is operated at a constant pixel writing time, the disc will be rotated at a constant linear velocity. Thus, the innermost tracks are written at the highest rotational speed. Assuming no gaps between the liquid crystal cells at the innermost tracks, the highest disc rotation speed with the eight-beam array is shown in the following table:

| No. of Pixels/Scan | Max. Disc Rot. Speed (rpm) |
| --- | --- |
| 3000 | 833.3 |
| 4000 | 625.0 |
| 6000 | 416.7 |
| 8000 | 312.5 |

Such speeds are compatible with commercially available, relatively low cost optical storage disc systems, which typically have rotational speeds below 1000 rpm. Further, resolutions between 3000×3000 pixels and 8000×8000 pixels are within the conveniional range for optical systems projecting full pages of information.

As the laser head is moved to write the oter tracks of the discs, the rotation speed of the disc must decrease. Moreover, as the writing head moves to tracks further out on the disc, the gaps encountered along the disc between the liquid cells become increasingly larger. (See FIG. 2; compare track 38 with track 40.) Therefore, the time required to write a track on the disc increases. It can be estimated that the average idle time of the laser head for a typical disc including three liquid cyrstal cells is about 40%. Using these estimations, a writing speed for a complete disc as a function of image resolution, using an eight-beam array, is shown in the following table:

| Image Resolution | Total Writing Time (min.) |
| --- | --- |
| 3000 × 3000 | 0.75 |
| 4000 × 4000 | 1.33 |
| 6000 × 6000 | 3.00 |
| 8000 × 8000 | 5.33 |

While the method and form of apparatus herein described constitute preferred embodiments of ths invention, it is to be understood that the invention is not limited to these precise methods and forms of apparatus, and that changes may be made therein without departing from the scope of the invention which is defined in the appended claims.

What is claimed is:

1. A method of creating a photomask, comprising the steps of:
   mounting for rotation a planar disc having at least a portion of the surface area of said disc defined by a photosensitive material;
   rotating said disc;
   supporting a laser beam source at a spaced relationship with respect to said disc;
   focusing at least one laser beam from said source onto said disc;
   simultaneously with rotating said disc, moving said source radially with respect to said disc to cause said laser beam to scan the surface area of said disc; and
   modulating said laser beam during said scanning in accordance with information corresponding to an image to cause said image to be written onto said photosensitive material by said laser beam.

2. The method as defined in claim 1, wherein said planar disc includes a plurality of discrete regions defined by said photosensitive material.

3. The method as defined in claim 2, wherein said discrete regions are substantially rectangular, and wherein three of said discrete regions are provided on said disc.

4. The method as define in claim 1, wherein said photosensitive material is a liquid crystal cell.

5. The method as defined in claim 4, wherein said liquid crystal cell is reflective.

6. The method as defined in claim 4, wherein said liquid crystal cell is transmissive.

7. The method as defined in claim 1, wherein said disc is rotated such that said laser beam scans the surface of said disc at a constant linear velocity.

8. The method as defined in claim 1, wherein a plurality of laser beams are focused simultaneouly onto said disc, each of said beams being independently modulated to cause each beam to write a separate portion of said image onto said disc.

9. Apparatus for creating a photomask corresponding to an image, comprising:
   a planar disc having discrete portions of the surface area of said disc defined by a liquid crystal material;
   means for mounting and rotating said disc; and
   scanning means for scanning at least one laser beam over the surface area of said disc during rotation to cause said image to be written onto said photosensitive material by said laser beam.

10. Apparatus as defined in claim 9, wherein said planar disc includes a plurality of discrete regions defined by said photosensitive material.

11. Apparatus as defined in claim 10, wherein said discrete regions are substantially rectangular, and wherein three of said discrete regions are provided on said disc.

12. Apparatus as defined in claim 11, wherein said discrete regions are square, said three regions being arranged symmetrically on said disc.

13. Apparatus as defined in claim 9, wherein said photosensitive material is a liquid crystal cell.

14. Apparatus as defined in claim 13, wherein said liquid crystal cell is reflective.

15. Apparatus as defined in claim 13, wherein said liquid crystal cell is transmissive.

16. Apparatus as defined in claim 13, wherein said rotation means rotates said disc such that said laser beam scans the surface of said disc at a constant linear velocity.

17. Apparatus as defined in claim 9, wherein said scanning means scans a plurality of laser beams over said disc to write said image onto said disc.

18. Apparatus for creating a photomask corresponding to an image, comprising:
   a planar disc having at least a portion of the surface area of said disc defined by a photosensitive material;
   means for mounting and rotating said disc;
   a laser beam source;
   means for supporting said laser beam source at a spaced relationship with respect to said disc;
   means for focusing a laser beam from said source onto said disc;
   means for moving said laser source mounting means radially wtth respect to said disc, whereby said laser beam is caused to scan the surface area of said disc; and
   means fo modulating said laser beam in accordance with information corresponding to said image to cause said image to be written onto said photosensitive material by said laser beam.

19. Apparatus as defined in claim 18, wherein said planar disc includes a plurality of discrete regions defined by said photosensitive material.

20. Apparatus as defined in claim 19, wherein said discrete regions are substantially rectangular, and wherein three of said discrete regions are provided on said disc.

21. Apparatus as defined in claim 20, wherein said discrete regions are square, said three regions being arranged symmetrically on said disc.

22. Apparatus as defined in claim 20, wherein said photosensitive material is a liquid crystal cell.

23. Apparatus as defined in claim 22, wherein said liquid crystal cell is reflective.

24. Apparatus as defined in claim 22, wherein said liquid crystal cell is transmissive.

25. Apparatus as defined in claim 20, wherein said rotation means rotates said disc such that said laser beam scans the surface of said disc at a constant linear velocity.

26. Apparatus as defined in claim 20, wherein said laser beam source produces a plurality of laser beams, each of said beams being focused simultaneouly onto said disc, and wherein said modulating means modulates each of said beams independently to cause each beam to write a separate portion of said image onto said disc.

27. Apparatus as defined in claim 26, wherein said laser beam source includes a plurality of laser emitting diodes.

28. Apparatus as defined in claim 27, wherein said means for focusing said beams includes a plurality of optical fibers, each of said fibers receiving one of said beams from one of said laser emitting diodes, said fibers being arranged into an array for focusing said beams onto said disc.

* * * * *